United States Patent
Rankin

(10) Patent No.: US 10,659,420 B2
(45) Date of Patent: May 19, 2020

(54) METHOD AND SYSTEM FOR AUTOMATIC CONTENT BASED E-MAIL RECIPIENT DETERMINATION

(71) Applicant: MASTERCARD INTERNATIONAL INCORPORATED, Purchase, NY (US)

(72) Inventor: Alex Rankin, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 156 days.

(21) Appl. No.: 15/657,737

(22) Filed: Jul. 24, 2017

(65) Prior Publication Data
US 2018/0026930 A1 Jan. 25, 2018

(30) Foreign Application Priority Data

Jul. 25, 2016 (EP) .................................... 16180952

(51) Int. Cl.
*H04L 12/58* (2006.01)
*G06Q 10/10* (2012.01)
*G06F 16/33* (2019.01)
*G06F 16/9535* (2019.01)

(52) U.S. Cl.
CPC ........... *H04L 51/28* (2013.01); *G06Q 10/107* (2013.01); *H04L 51/02* (2013.01); *H04L 51/22* (2013.01); *G06F 16/3344* (2019.01); *G06F 16/9535* (2019.01)

(58) Field of Classification Search
CPC ....... G06F 3/048; G06F 17/30; G06Q 10/107; H04L 51/02; H04L 51/22
See application file for complete search history.

(56) References Cited

U.S. PATENT DOCUMENTS

| 8,769,695 | B2 * | 7/2014 | Richards | G06F 21/552 726/22 |
| 2011/0191428 | A1 | 8/2011 | Nairn et al. | |
| 2012/0260188 | A1 * | 10/2012 | Park | G06Q 10/107 715/739 |
| 2013/0080543 | A1 * | 3/2013 | Jang | G06Q 10/107 709/206 |

OTHER PUBLICATIONS

International Search Report and Written Opinion (10 pgs.), dated Sep. 22, 2017, issued in PCT Patent Application No. PCT/US2017/043033, which has the same priority claim as the instant application.

* cited by examiner

*Primary Examiner* — Joshua D Taylor
*Assistant Examiner* — Adil Ocak
(74) *Attorney, Agent, or Firm* — Harness, Dickey & Pierce, P.L.C.

(57) ABSTRACT

A computer implemented method for automatic, content based potential e-mail recipient determination, the method comprises the steps of comparing, by a sender, application plugin, the content of an e-mail being written by a user with keywords listed in as entries in a database, wherein the keywords are correlated with at least one e-mail address; and presenting, if at least part of the content of the e-mail matches with at least one keyword in the database, the e-mail address associated with the at least one keyword for selection as e-mail recipient to the user. An according system for automatic, content based potential e-mail recipient determination is disclosed.

12 Claims, 2 Drawing Sheets

METHOD AND SYSTEM FOR AUTOMATIC CONTENT BASED E-MAIL RECIPIENT DETERMINATION

CROSS-REFERENCE TO RELATED APPLICATION

Figure 1:
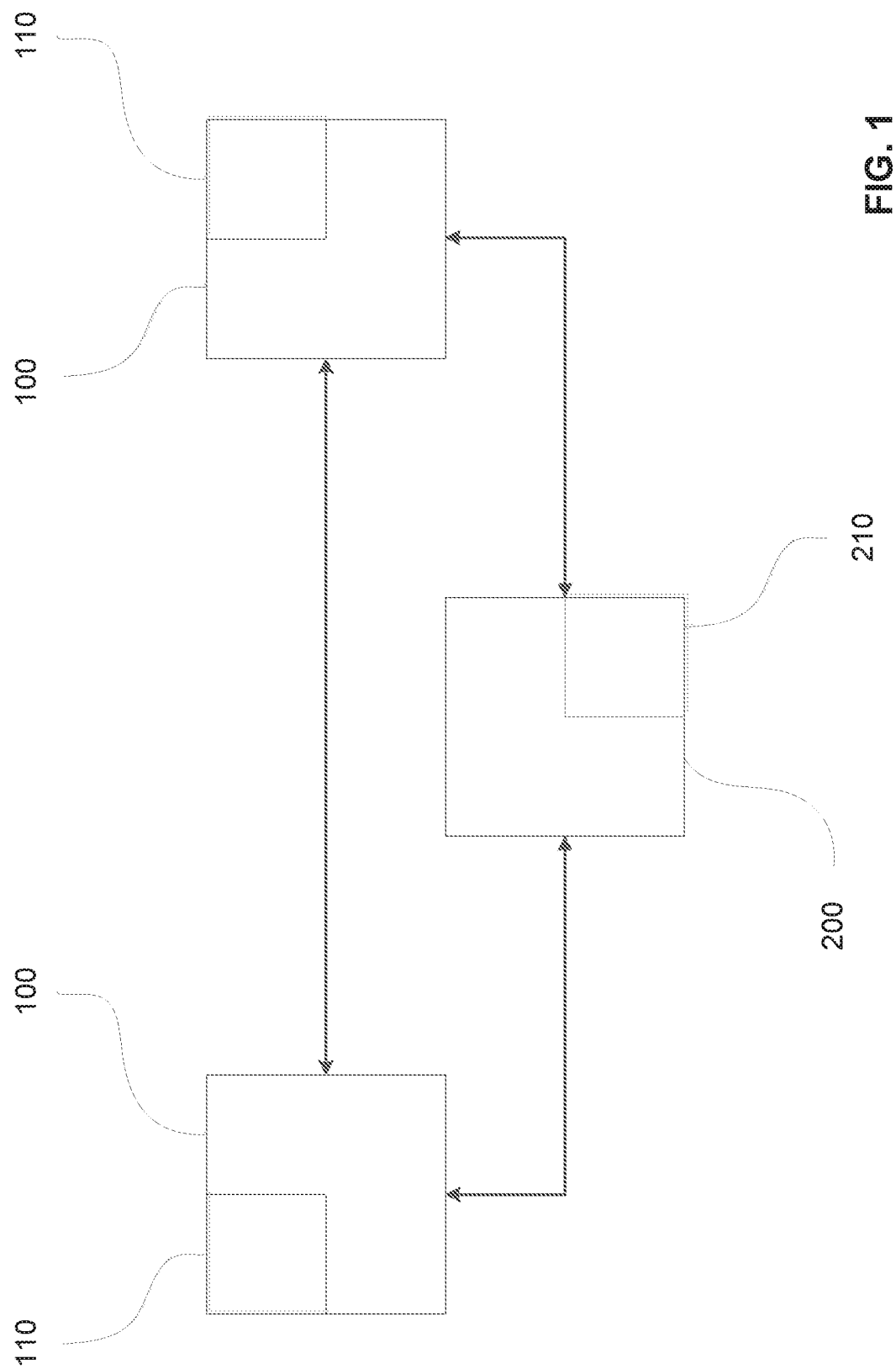

This application claims the benefit of and priority to European Patent Application No. 16180952.0, filed Jul. 25, 2016. The entire disclosure of the above application is incorporated herein by reference.

FIELD

The present disclosure concerns a computer implemented method for automatic, content based potential e-mail recipient determination. The present disclosure further concerns a system for automatic, content based potential e-mail recipient determination.

BACKGROUND

This section provides background information related to the present disclosure which is not necessarily prior art.

Corresponding via electronic data communication, such as e-mail, has become a commonly accepted way of communicating. Not only in personal life but also in a business environment nowadays most written communication is carried out via e-mail. However, besides the obvious advantages, like the ease of use, fast delivery and the like, for example, new employees having a problem or query about an internal tool or process often are not able to identify who to turn to. This often leads to time consuming searches which often include asking and e-mailing the incorrect people. Besides these problems on the user side, also technical disadvantages, such as, the congestion of networks and server capacities occur.

Another frequent problem is that e-mails are sent to too many people, for example, by the accidental use of a large distribution list, most of whom simply ignore the e-mails, often not willing to even delete e-mails because it is too time consuming. This again leads to wasted server capacities.

Accordingly, in light of increased electronic communication, there is a need for enhancing the process of addressing the correct recipients in order to reduce network traffic and to reduce the use of server capacity, and to increase productivity.

Especially, in a business environment, there is a problem of sharing knowledge, and receiving assistance on specific topics meaning that it is difficult in a larger group of people to find the right person or people to address with a specific topic.

SUMMARY

This section provides a general summary of the disclosure, and is not a comprehensive disclosure of its full scope or all of its features. Aspects and embodiments of the disclosure are set out in the accompanying claims.

The present disclosure provides one or more solutions to the problems and disadvantages of the background art. Other technical advantages of the present disclosure will be readily apparent to one skilled in the art from the following description and claims.

The present disclosure is directed to a computer implemented method for automatic, content based potential e-mail recipient determination. The method comprises the consecutive steps of comparing, by a sender application plugin, the content of an e-mail being written by a user with keywords listed as entries in a database, wherein the keywords are correlated with at least one e-mail address, and of presenting, if at least part of the content of the e-mail matches with at least one keyword in the database, the e-mail address associated with the at least one keyword for selection as e-mail recipient to the user.

The present disclosure is further directed to a system for automatic, content based potential e-mail recipient determination. The system comprises a sender application plugin executed on a terminal of a user interacting with an e-mail client executed on the terminal; and a central database stored on a server, the database containing entries of keywords correlated with e-mail addresses and/or a database on the terminal containing entries of keywords correlated with e-mail addresses, wherein the sender application plugin being configured to communicate with the database and compare the content of the e-mail added by the user writing the e-mail with the content of the database, the sender application plugin being further configured to present, if at least part of the content of the e-mail matches with at least one keyword in the database, the e-mail address associated with the at least one keyword for selection as e-mail recipient to the user.

In one embodiment of the disclosure recipients' e-mail addresses, manually added by the user, are added to the database and correlated with at least one keyword identified in the content of the e-mail, and/or updated with the at least one keyword identified in the content of the e-mail.

According to another aspect of the present disclosure the database additionally contains terms or phrases excluded from use as keywords for e-mail recipient determination.

In order to further reduce incorrect addressed e-mail traffic, erroneously selected recipients can indicate after reviewing the content of the e-mail, at a recipient's sender application plugin, that the sent e-mail was not meant for them. Furthermore, the database could be updated according to the indication by the erroneously selected recipient. Even though generally the recipient's sender application plugin could have an identical functionality as the sender application plugin from which the e-mail is sent the functionality of the recipient's sender application plugin could differ from the one on the sender's terminal.

In another embodiment, the determination of a potential recipient is based on a probability value associated to the database entries or is based on an overall probability value calculated on the basis of at least two probability values associated to at least the database entries. This would allow to further enhance the accuracy of the suggested recipient.

In order to further enhance the accuracy of the suggested recipient the probability value related to the keyword is influenced by at least one predetermined parameter, the predetermined parameter could be selected from a list containing, e.g., place of finding of the keyword in the e-mail, frequency of occurrence of the keyword in the e-mail, and role or function of the person linked to the e-mail address, frequency of correct e-mail delivery to the determined e-mail address based on the respective keyword(s).

In yet another embodiment, the determination of the potential recipient is based on the combination of at least two keywords, wherein the number of keywords found in the content and associated to an e-mail address increases the overall probability value.

In order to be able to permanently exclude recipients from being suggested from an e-mail, including certain content in a further embodiment, keywords in the database could be linked to a negative probability value, indicating that the e-mail should not be sent to the e-mail address associated thereto.

In another embodiment, the sender application plugin is further configured to mirror the central database to a database on the terminal and vice versa. This allows that changes made to the database on the server or the terminal are directly available in the terminal or the server, respectively. The mirroring could be triggered automatically at different incidences, e.g., at the start of or the login in the terminal, after certain time intervals, or the like.

In order to allow actuality of the central database the sender application plugin could determine and/or submit new entries and/or entry update requests to the server for updating the central database and/or the database on the terminal, e.g., every time an update that the database in the sender application plugin occurs or in regular intervals.

In a further embodiment, the sender application plugin is configured to transmit, responsive to confirmation or denial by the recipient of the e-mail, confirmation or denial information to the central database and/or the database on the terminal of the sender or the recipient for updating the respective entry. This would allow to automatically update of the central database or the database on the terminal such that an automatic improvement of the suggestions is achieved.

The disclosure further concerns a computer program product comprising computer executable instructions embodied in a computer readable medium for performing any steps of the method described above.

The disclosure yet further concerns a computer readable medium storing program instructions, which, when executed by a processor of a computer, cause the computer to perform any of the method steps described above.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, the accompanying drawings illustrate exemplary embodiments of the disclosure and serve to explain, by way of example only, the principles of the disclosure.

Figure 2:
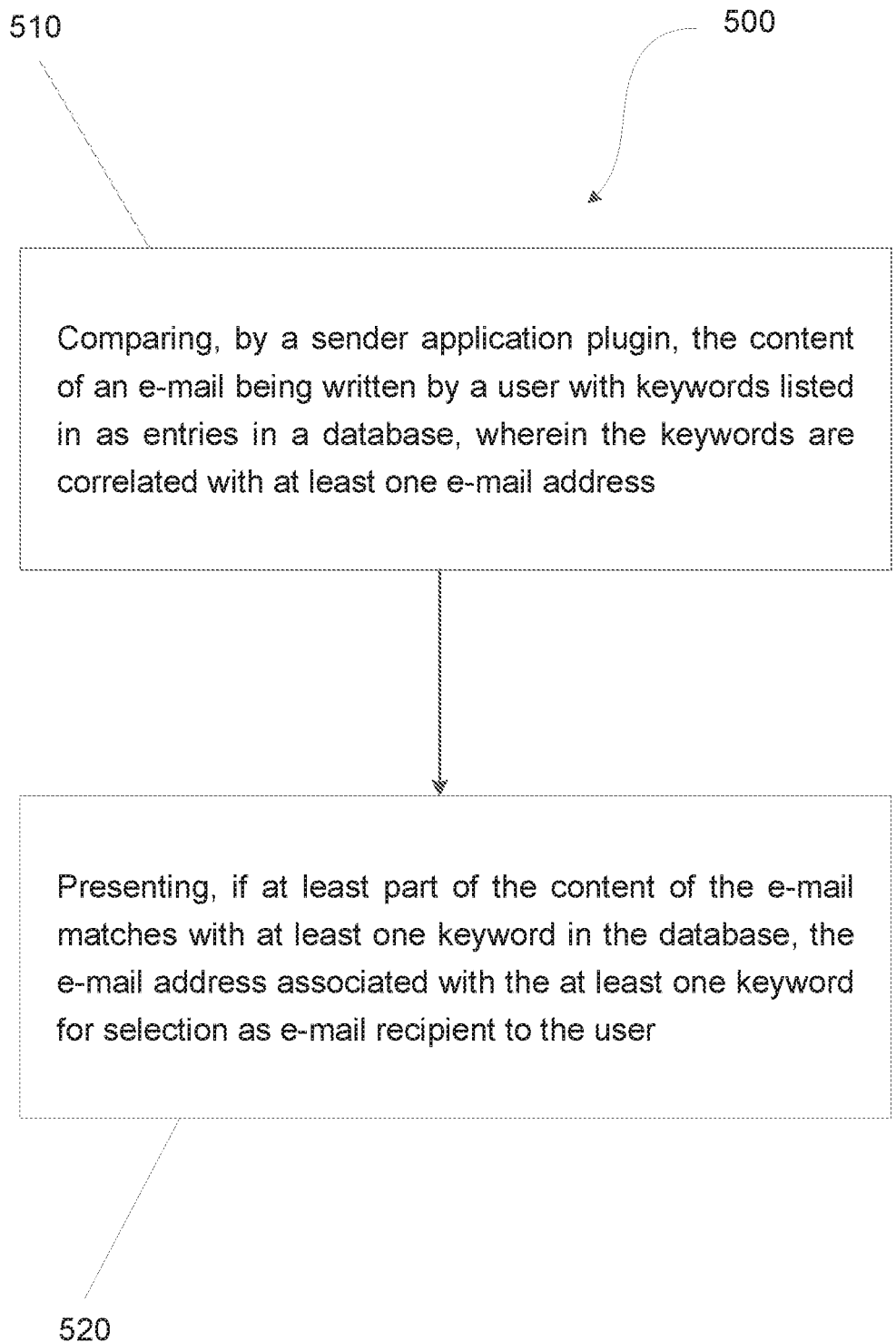

FIG. 1 shows a block diagram showing entities involved in the method for automatic, content based potential e-mail recipient determination according to the present disclosure, and FIG. 2 shows a flow chart reflecting a method for automatic, content based potential e-mail recipient determination according to the present disclosure.

Corresponding reference numerals indicate corresponding parts throughout the several views of the drawings.

DETAILED DESCRIPTION

Embodiments of the present disclosure will be described, by way of example only, with reference to the drawings. The description and specific examples included herein are intended for purposes of illustration only and are not intended to limit the scope of the present disclosure.

The present disclosure will now be described more fully with reference to an example and to the accompanying figures, in which a preferred embodiment is shown. The method, however, may be embodied in many different forms and not be construed as limited to the embodiments set forth herein. It should be noted that these figures are intended to illustrate the general characteristics of the methods utilized in certain embodiments. However, the example and the figures may not precisely reflect the structure of performance characteristic of any given embodiment. Moreover, in the figures, like reference signs designate corresponding parts throughout the different views or embodiments.

In FIG. 1 shows the entities involved in the computer implemented method for automatic, content based potential e-mail recipient determination, the method comprising two sender application plugins 100, which are each part of a not shown terminal, a database 110 incorporated in each sender application plugin 100 and a central database 210 on a server 200. In a first step, the sender application plugin 100 compares the content of an e-mail which is written by a user with keywords listed in as entries in a database 110. In the database 110 the keywords are correlated with at least one e-mail address. In a further step, the e-mail address associated with the at least one keyword for selection as e-mail recipient to the user presenting, if at least part of the content of the e-mail matches with at least one keyword in the database 110.

FIG. 2 shows a flowchart reflecting the steps of the method 500 on how a suitable e-mail address is suggested by sender application plugin 100 based on the content of an e-mail. In step 510 the sender application plugin 100 compares the content of an e-mail being written by a user with keywords listed in as entries in a database 110 and/or 210, wherein the keywords are correlated with at least one e-mail address. In step 520, if at least part of the content of the e-mail matches with at least one keyword in the database, the e-mail address associated with the at least one keyword for selection as e-mail recipient is presented to the user by the sender application plugin 100.

The setup of the database 110 and/or database 210 could start with an empty database. In a first step, to provide an initial content for the database a blacklist of words could be included in the sender application plugin 100 or by programming the database 210 directly on the server 200, e.g., by creating a blacklist including simple words such as common verbs, pronouns, conjunctions, proper nouns, or the like, and/or by adding keyword-e-mail address conjunctions in order to be able to suggest possible recipients based on the content of an e-mail.

There are several users on the network all using a sender application plugin 100. These users will be sending various e-mails to each other of which some will be directed to the correct user, while others are sent to users which are not interested in the e-mail because the content of the e-mail does not concern the specific user.

The following is one example how the database could build a list of identifiers to correctly recommend e-mail addresses to future users. It is not an exact description of the implementation, only a pseudo implementation. All e-mails are exchanged within a single company, ABCtech, and the example concerns a product, TBproduct.

Example

First Interaction

The user John Q. Public (john.public@abctech.com) e-mails the following message to Jane Y. Audience (jane.audience@abctech.com).

To: jane.audience@abctech.com
From: john.public@abctech.com
Subject: TBproduct Website Down
Body:
Hey Jane, The TBproduct website seems to be down again. Could you restart server ABC23A?
Best Regards,
John The plugin/application then scans this e-mail, and starts to build a profile of identifiers: jane.audience@abctech.com. The following highlights show what is used as an identifier in brackets { }, and what is ignored as being a common word or phrase in brackets H.

To: jane.audience@abctech.com
From: john.public@abctech.com
Subject: {TBproduct Website Down}
Body:
[Hey Jane],
[The] {TBProduct website} [seems to be] {down} [again]. [Could you] {restart server ABC23A}?
[Best Regards],
[John]

The database will be updated according to the following identifiers associated with jane.audience@abctech.com:

| IDENTIFIER | PROBABILITY VALUE |
| --- | --- |
| tbproduct website down | 2 |
| tbproduct website | 1 |
| restart server | 1 |
| ABC23A | 1 |

More Interactions

After Jane Audience has received several more similar e-mails under the e-mail address jane.audience@abctech.com the following database will be updated with the following information:

| IDENTIFIER | PROBABILITY VALUE |
| --- | --- |
| tbproduct website down | 18 |
| tbproduct website | 12 |
| restart server | 8 |
| ABC23A | 24 |
| tbproduct query | 11 |
| server down | 7 |

Jane also has a new colleague Michael Z. Listener (michael.listener@abctech.com) who just started on her team. His profile is as follows:

| IDENTIFIER | PROBABILITY VALUE |
| --- | --- |
| tbproduct website down | 3 |
| tbproduct website | 3 |
| restart server | 1 |
| ABC23A | 4 |
| server down | 3 |

Additionally, another person, Tom A. Hearer (tom.hearer@abctech.com) in the company is in charge of a different product named Kyproduct. He has a profile like this:

| IDENTIFIER | PROBABILITY VALUE |
| --- | --- |
| kyproduct website down | 20 |
| kyproduct website | 15 |
| restart server | 12 |
| XYZ55L | 22 |

-continued

| IDENTIFIER | PROBABILITY VALUE |
| --- | --- |
| kyproduct query | 5 |
| server down | 12 |

One of the managers Bill B. Auditor (bill.auditor@abctech.com) then wants to send a query about a server being down, but doesn't know who to send it to. In the following different e-mails he could send, and who the suggested recipients would be are shown.

First E-Mail Recipient Recommendation Attempt
From: bill.auditor@abctech.com
Subject: Server Website Down
Body:
To Whom It May Concern,
Who took one of the servers down. Can you look into it?
Thanks,
Bill This e-mail will now be analysed by the sender application plugin 100 to generate a list of potential recipients. This is done in a similar manner to how the identifiers were initially constructed. Following identifiers are pulled out of the e-mail:

From: bill.auditor@abctech.com
Subject: {Server Website Down}
Body:
[To Whom It May Concern],
[Who took one of the] {servers down}. [Can you look into it]?
[Thanks],
[Bill]

Thus, this e-mail contains two identifiers. In order to work the disclosure the following assumptions are made. Firstly, the algorithm used in this example won't do partial matching on identifiers—otherwise it could match the "website down" part of the first identifier to both "tbproduct website down" and "kyproduct website down" at a lower weight (e.g., $\frac{2}{3}^{rd}$ of the weight). Thus, matching of the entire identifier is required. However, plurals in the identifier and/or individual identifiers could also be matched.

This results in that the only identifier matching the above users is "server(s) down". It matches the users with the following weights:

| USER | PROBABILITY VALUE |
| --- | --- |
| jane.audience@abctech.com | 7 |
| michael.listener@abctech.com | 3 |
| tom.hearer@abctech.com | 12 |

The sender application plugin 100 is set to have a threshold for minimum weight—which is set to 5. This means that michael.listener@abctech.com is not suggested, since the overall weight is too low. The other two e-mail addresses are then arranged in descending weight, and presented to the user. The user Bill for convenience reasons, then chooses the first address from the list (tom.hearer@abctech.com). In this example TBproduct website is down, and not Kyproduct website, so the user Tom was the wrong person to contact.

Upon receiving the e-mail, the user Tom rejects the e-mail by clicking a button in the sender application plugin 100 on the recipient's terminal indicating that the suggestion of his e-mail address was incorrect. The sender application plugin 100 then reduces the weight for "server down" to 11 for his e-mail address in the database in the sender application plugin 100, and automatically sends a response to Bill stating that Tom rejected the e-mail recommendation as an incorrect recipient. Upon the next connection of the sender application plugin 100 with the server 200, the database 210 on the server is updated accordingly.

Second E-Mail Recipient Recommendation Attempt

Bill now realizes that his first e-mail was too indefinite. Thus, he rewrites his e-mail:

From: bill.auditor@abctech.com
Subject: Server Down—TBproduct Website
Body:
To Whom It May Concern,
It looks like one of the servers is down for the TBproduct website. I think it's ABC23A.
Can you look into it?
Thanks,
Bill This is more exact, so the following identifiers are extracted:

From: bill.auditor@abctech.com
Subject: {Server Down}—{TBproduct Website}
Body:
[To Whom It May Concern,]
[It looks like one of the] {VMs} [is] {down} [for the] {TBproduct website}. [I] [think it's] {ABC23A}. [Can you look into it]?
[Thanks],
[Bill]

Since the term "TBproduct website" is mentioned twice, it has an additional weight multiplier associated with it, e.g., by multiplying the weight by factor 2. This kind of weight multiplier can be assigned to different things, such as identifiers that appear in the subject (since that is generally a summary of the problem, making the identifiers used have a higher importance). This builds the following list:

| IDENTIFIER | MULTIPLIER |
|---|---|
| server down | 1× |
| tbproduct website | 2× |
| vm down | 1× |
| ABC23A | 1× |

This produces the following weights for the users (keeping in mind that Tom's "server down" weight was reduced to 11 previously):

| USER | PROBABILITY VALUE |
|---|---|
| jane.audience@abctech.com | 55 |
| michael.listener@abctech.com | 13 |
| tom.hearer@abctech.com | 11 |

This now shows jane.audience@abctech.com as the top recipient recommendation, with michael.listener@abctech.com as the second recommendation and tom.hearer@abctech.com as the third. Bill chooses both Jane and Michael for recipients, which increases each of their identifiers by 1 point (and the "tbproduct website" identifier by 2 points). Since the "vm down" identifier didn't previously exist, this is then added to their identifier lists.

Additional behavior could also be built around the weight lists given. For example, recommendations that fall too far below the highest recommended recipient, for example $\frac{1}{5}^{th}$, which would have removed the incorrect tom.hearer@abctech.com from the e-mail address, could be ignored. It could also just highlight jane.audience@abctech.com as a "highly-matched" recipient, indicating that she is likely to be a correct recipient.

The above is a very simple example of how the database could begin to be populated, how recipients could be suggested, and how to improve the matches. All values and approaches to matching identifiers are just pseudo implementations, and not the actual algorithmic approach that would be used. Indeed, the identifiers in the example are only keywords, where other identifiers (such as formatting, colour, etc.) could also be used. Given that the sender application plugin 100 used for a certain period of time, different approaches to increasing/decreasing or using the weight could to be used, e.g., it is likely that a logarithmic function would suit best in implementation for the increase/decrease of weights instead of the constant function used in the example above.

This description uses examples to disclose the disclosure, including the best mode, and also to enable any person skilled in the art to practice the disclosure, including making and using any devises or systems and performing any incorporated methods. The patentable scope of the disclosure is defined by the claims, and may include other examples that occur to those skilled in the art.

With that said, and as described, it should be appreciated that one or more aspects of the present disclosure transform a general-purpose computing device (or computer) into a special-purpose computing device when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer implemented method for automatic, content based potential e-mail recipient determination, the method comprising:
    comparing, by a sender application plugin, the content of an e-mail being written by a user with keywords listed in a database, wherein the keywords are identified to at least one e-mail address of at least one other user based on prior communications involving the at least one email address of the at least one other user;
    identifying multiple of the keywords listed in the database within the content of the e-mail;
    determining, by the sender application plugin, a probability value for the at least one e-mail address based on a frequency of the identified keywords within the content of the e-mail; and
    presenting, by the sender application plugin, the at least one e-mail address to the user for selection by the user as a potential e-mail recipient when the probability value satisfies a threshold.

2. The method according to claim 1, wherein the database additionally contains terms or phrases excluded from being identified to the at least one e-mail address.

3. The method according to claim 1, wherein erroneously selected recipients can indicate after reviewing the content of the e-mail, at a recipient's sender application plugin, that the sent e-mail was not meant for them.

4. The method according to claim 3, wherein the database is updated according to the indication by the erroneously selected recipient.

5. The method according to claim 1, wherein the probability value is further determined based on at least one predetermined parameter, the predetermined parameter being selected from a place of finding of the identified keywords in the content of the e-mail and a role or function of a person linked to the at least one e-mail address.

6. The method according to claim 5, wherein keywords in the database are linked to a negative probability value, indicating that the e-mail should not be sent to the e-mail address identified thereto.

7. The method according to claim 1, wherein determining the probability value is based on a combination of probability values, for each of the identified keywords, multiplied by the frequency of the identified keywords in the content of the e-mail.

8. A system for automatic, content based potential e-mail recipient determination, the system comprising:
    a sender application plugin executed on a terminal of a user interacting with an e-mail client; and
    a central database stored on a server, the central database containing entries of keywords correlated with e-mail addresses and/or a database on the terminal containing entries of keywords correlated with e-mail addresses;
    wherein the sender application plugin is configured to:
        communicate with the central database and/or the database on the terminal and compare the content of the e-mail added by the user writing the e-mail with a plurality of the keywords of the central database and/or the database on the terminal, wherein the plurality of the keywords are correlated with at least one e-mail address of at least one other user based on communications involving the at least one e-mail address of the at least one other user;
        identify multiple of the keywords listed in the central database and/or the database on the terminal within the content of the e-mail;
        determine a probability value for the at least one e-mail address of the at least one other user based on a frequency of the identified keywords within the content of the e-mail; and
        present the at least one e-mail address to the user for selection as a potential e-mail recipient when the probability value satisfies a threshold.

9. The system of claim 8, wherein the sender application plugin is further configured to mirror the central database in the database on the terminal.

10. The system according to claim 8, wherein the sender application plugin is further configured to determine and/or submit new entries and/or entry update requests to the server for updating the central database and/or the database on the terminal.

11. The system according to claim 8, wherein the sender application plugin is further configured to transmit, responsive to confirmation or denial by a recipient of the e-mail, when the potential e-mail recipient is selected by the user, confirmation or denial information to the central database and/or the database on the terminal for updating the respective entry.

12. A non-transitory computer readable storage medium storing program instructions, which, when executed by a processor of a computer, cause the computer to:
    compare, by a sender application plugin, the content of an e-mail being written by a user with keywords listed as entries in a database, wherein the keywords are correlated with at least one e-mail address of at least one other user based on prior communications involving the at least one email address of the at least one other user;
    identify multiple of the keywords listed in the database within the content of the e-mail;
    determine a probability value for the at least one e-mail address based on a frequency of the identified keywords within the content of the e-mail, wherein the probability value includes a combination of probability values, for each of the identified keywords, multiplied by the frequency of the identified keyword in the content of the e-mail; and present the at least one e-mail address to the user for selection by the user as a potential e-mail recipient when the probability value satisfies a threshold.

* * * * *